Sept. 19, 1944.   H. P. SMITH   2,358,540
BRAKING SYSTEM
Filed Oct. 10, 1942
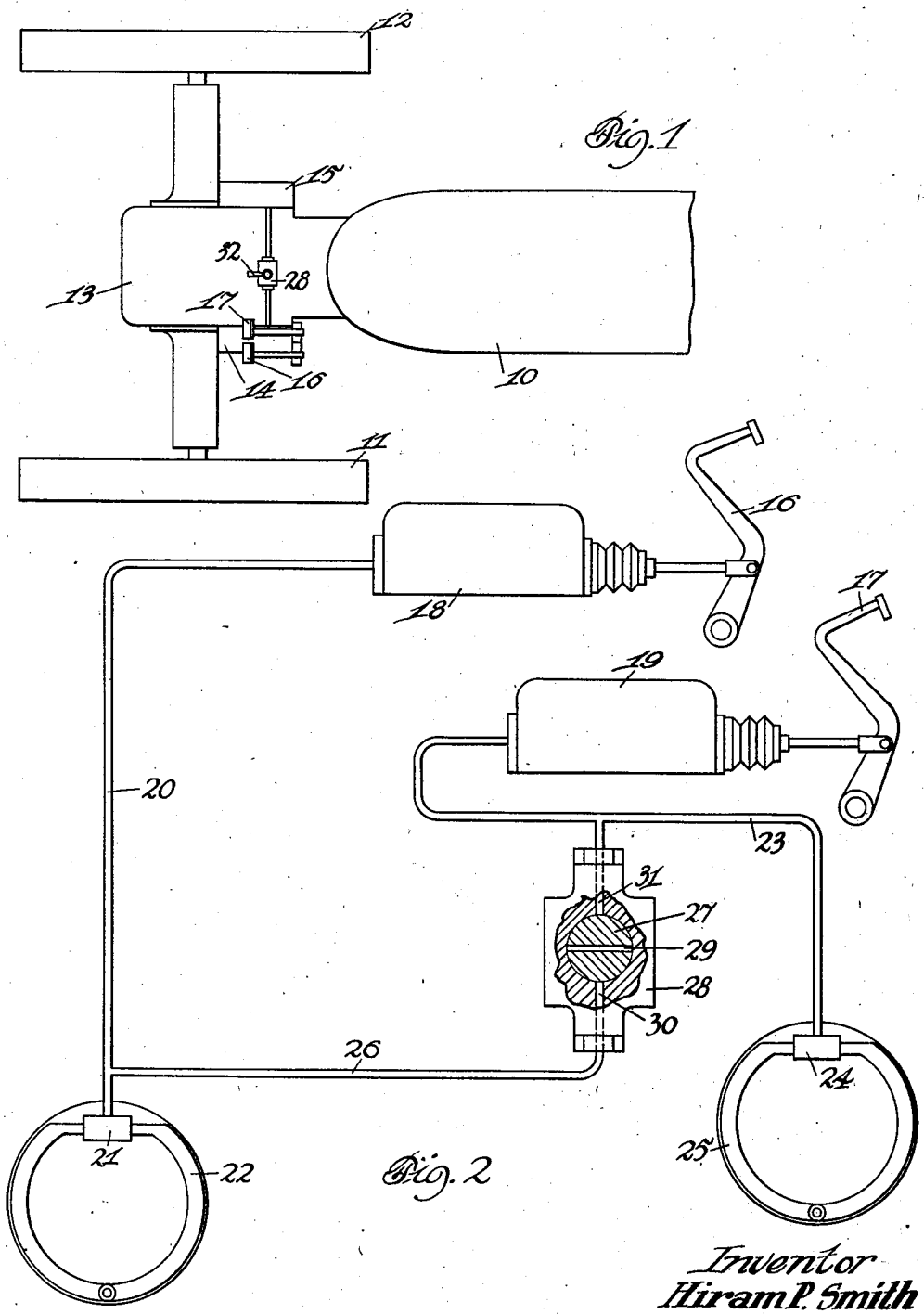
Inventor
Hiram P. Smith
By Paul O. Pippel
Atty Patented Sept. 19, 1944

2,358,540

UNITED STATES PATENT OFFICE 2,358,540

BRAKING SYSTEM

Hiram P. Smith, Canton, Ill., assignor to International Harvester Company, a corporation of New Jersey Application October 10, 1942, Serial No. 461,553

4 Claims. (Cl. 188—152)

This invention relates to a braking system and more particularly to a braking system for vehicles, such as tractors.

The invention is concerned particularly with the provision of an improved braking system for agricultural tractors of the type that are operable through varying speed ranges.

In such tractors slow speeds are provided for the operation of the tractor in field work, and the brakes are so arranged as to be capable of application to either one of the rear wheels, depending upon the direction in which the tractor is turned. This arrangement provides the usual form of steering assisted by braking.

Most tractors of the type referred to are without provision for the effecting of any change in the ordinary braking arrangement, with the result that the brakes may be similarly operated during high speed travel of the tractor. It has been found that this presents a decided hazard, since the application of the brakes independently during high speed travel of the tractor can result in upsetting of the tractor and consequent injury to the operator.

The principal object of the present invention is to provide an improved braking system incorporating safety means enabling the simultaneous operation of the tractor brakes so that dangers during high speed travel of the tractor are eliminated or at least minimized.

An important object of the invention is to adapt the improved safety means to a hydraulic braking system.

Another object of the invention is to provide a braking system having a pair of pedal-operated, independently actuatable brakes, by means of which the usual form of brake-assisted steering may be accomplished, and to incorporate a connection between the brakes having means by which this connection may be controlled to provide for simultaneous application of the tractor brakes.

Other important objects and desirable features of the invention may be had from the following detailed description taken in conjunction with the accompanying sheet of drawings, in which:

Figure 1 is a plan view of the rear portion of a tractor, illustrating generally the braking arrangement; and Figure 2 is a view showing schematically one form of the braking system.

The tractor chosen for the purposes of illustration is representative of the usual form of agricultural tractor and is shown as including a body 10 carried on right and left rear traction wheels 11 and 12. The body 10 includes a transmission housing 13 in which is enclosed drive means for the traction wheels, this drive means further including a transverse countershaft with which is associated a pair of brakes for the wheels. As shown in Figure 1, these brakes are respectively housed in brake housings 14 and 15, one at each side of the tractor body 10.

One side of the tractor body is provided with means carrying a pair of brake pedals 16 and 17, which, as will be hereinafter described, are adapted for the independent operation of the braking mechanism contained in the brake housings 14 and 15.

As best shown in Figure 2, the right-hand brake pedal 16 is connected to a master hydraulic cylinder 18, which may be of any conventional form. The left-hand brake pedal 17 is connected to a similar cylinder 19. The cylinder 18 is connected by a conduit 20 to a brake-operating cylinder 21 associated with brake mechanism 22 for the right-hand traction wheel 11. The brake mechanism may be of any conventional form.

The cylinder 19 is connected by a conduit 23 to a brake-operating cylinder 24 for brake mechanism 25 for the left-hand traction wheel 12. The brake mechanisms 22 and 25 are respectively housed in the brake housings 14 and 15.

From the description thus far, it will be seen that pressure on the brake pedal 16 will result in the application of the brake on the right-hand traction wheel 11, and that similar results follow with respect to the left-hand traction wheel 12 upon operation of the left-hand brake pedal 17. It will be noted that the brakes are independently operable and each has its own operating means, such as the pedals 16 and 17.

It has heretofore been common practice in braking systems similar to that disclosed to depend for simultaneous application of the brakes upon the ability of the operator to depress both pedals at once. In some cases, provision has been made in the form of latch means for locking the pedals together. However, neither system has proved effective.

According to the present invention, means are provided for connecting the brake mechanisms for simultaneous operation. This means includes a conduit 26 cross-connecting the fluid lines 20 and 23. The conduit 26 includes a rotatable valve 27 contained in a housing 28 and having a passage 29 therein adapted to connect passages 30 and 31 formed in the valve housing 28 and in communication with opposite sides of the cross-connecting conduit 26. This valve may be operated by a control lever 32.

In the operation of the tractor for ordinary field purposes, during which the tractor is run slowly, the valve 27 is positioned, as shown in Figure 2, so that the conduit 26 is blocked against the passage of fluid therethrough. Accordingly, the pedals 16 and 17 may be actuated for independent operation of the brake mechanisms 22 and 25, and the usual result of brake-assisted steering may be obtained. When the tractor is to be operated at higher speeds, in which circumstances independent braking would be dangerous, the operator rotates the valve 27 by means of the handle 32 so that the passage 29 in the valve cross-connects the passages 30 and 31 in the valve housing. There is thus provided a free communication between the conduits 20 and 23 so that application of either of the brake pedals 16 and 17, or both, results in the forcing of fluid under equal pressure to both of the brake mechanisms 22 and 25, with the result that the traction wheels 11 and 12 are braked simultaneously.

It will thus be seen that the invention provides means by which independently operable brakes may be connected together for simultaneous operation, and that the use of such means in the braking systems of tractors of the type referred to provides for the minimizing or elimination of dangers ordinarily inherent in high-speed tractor operation. It will be understood, of course, that the foregoing description pertains to only one form of the invention, and that the invention may be embodied in several forms without departing from the spirit and scope thereof, as defined in the appended claims.

What is claimed is:

1. In a braking system for tractors having a pair of traction wheels, an independent brake for each of said wheels, separate hydraulic actuating means for each of said brakes, separate pedal-operated means for supplying actuating fluid under pressure to each said actuating means including independent conduits, means including an interconnecting conduit providing a free communication between said conduits for the flow of the actuating fluid during certain phases of tractor operation, and means for blocking said interconnecting conduit during certain other phases of tractor operation.

2. In a braking system for tractors having a pair of traction wheels and an independent brake for each of said traction wheels, hydraulic actuating means for each of said brakes, brake-operating means for delivering fluid under pressure to said actuating means for independently operating each of the brakes, and means for connecting said brake-operating means together whereby they may be also operated in unison with fluid under equal pressure being supplied to each actuating means.

3. In a braking system for tractors having a pair of traction wheels and an independent brake for each of said wheels, separate hydraulic actuating means for each of said brakes, separate pedal-operated means for supplying fluid under pressure to each said actuating means including independent conduits, conduit means providing a communication between said conduits, and valve means selectively operable to provide for either the blocking of the conduit means or for the flow of the actuating fluid through said conduit means.

4. In a braking system for tractors having a pair of traction wheels and an independent brake for each of said wheels, hydraulic actuating means for each of said brakes, independent pedal-operated means for supplying fluid under pressure to each of said actuating means including independent conduits, conduit means providing a communication between said conduits for supplying fluid under uniform pressure to each said brake upon actuation of only one said pedal-operated means, and valve means selectively operable to provide for either the blocking of the conduit means or for the flow of the actuating fluid through said conduit means.

HIRAM P. SMITH.